United States Patent [19]

Baier et al.

[11] 4,405,382
[45] Sep. 20, 1983

[54] SCARFING BURNER ARRANGEMENT

[75] Inventors: Alfred Baier, Kronberg; Alfred Lucht, Bickenbach; Gerhard Munch, Frankfurt; Alfred Pfeuffer, Neu-Isenburg, all of Fed. Rep. of Germany

[73] Assignee: Messer Griesheim GmbH, Frankfurt am Main, Fed. Rep. of Germany

[21] Appl. No.: 406,218

[22] Filed: Aug. 9, 1982

[30] Foreign Application Priority Data

Sep. 11, 1981 [DE] Fed. Rep. of Germany ....... 3136023

[51] Int. Cl.³ .............................................. B23K 7/02
[52] U.S. Cl. .................................... 148/9 R; 148/9.5; 266/49; 266/50; 266/51
[58] Field of Search ............................. 266/49, 50, 51; 148/9 R, 9.5

[56] References Cited

U.S. PATENT DOCUMENTS 4,329,187  5/1982  Ushioda et al. ....................... 266/49

Primary Examiner—W. Stallard
Attorney, Agent, or Firm—Connolly and Hutz

[57] ABSTRACT

During the flame cutting of a workpiece, a slag bead is produced and is removed by a scarfing burner directed only towards the cut surface of the workpiece.

6 Claims, 2 Drawing Figures

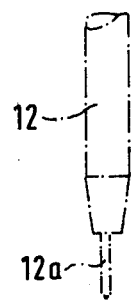
FIG.1
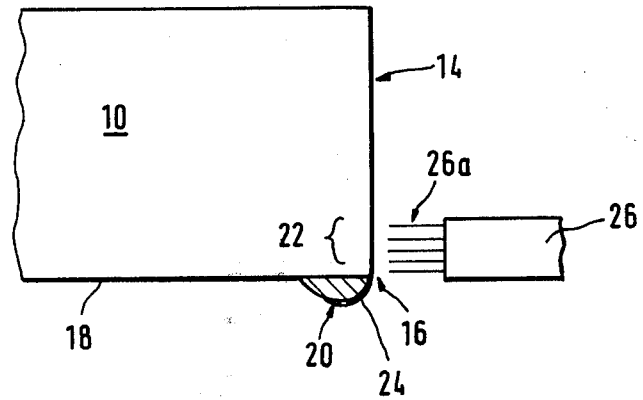
FIG.2
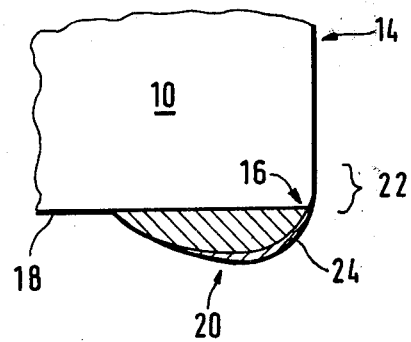

SCARFING BURNER ARRANGEMENT

BACKGROUND OF INVENTION

The invention relates to the arrangement of a scarfing burner for removing the slag bead produced in flame cutting of a workpiece.

In flame cutting, especially when cutting thick blocks and slabs, a so-called slag bead is produced on the side of the workpiece adjacent to the cut surface—usually at the bottom—which is connected with the base material in a thin strip along the edge between the bottom and the cut surface. In normal ingot flame cutting installations, in which the continuously cast ingot is cut across into certain section lengths, the slag bead is produced at the end of the block or slab.

In the jumbo slab ingot casting installations also used in recent years, the ingot is not only cut across but the slab is divided, for example, in two narrow slabs. In this case, the slag bead is also produced along the entire length of the slab at the bottom of the above-mentioned longitudinal parallel section. Such slag beads produce irregularities and waste in the subsequent operating step, for example, rolling of a workpiece. When this relates to a slag bead which occurs in flame cutting, the roll surfaces are damaged when such a workpiece enters in the roll nip. During rolling, these slag components are rolled into the surface of the plate and consequently produce defect areas.

It is therefore necessary to remove the troublesome slag bead before processing the workpiece (block, slab or the like). This may take place, for example, by chiseling or grinding. Methods, therefore, when applied manually are often time-consuming and, therefore, not economical.

It is furthermore known to remove the slag bead by scarfing. In the equipment of German DE-PS No. 12 87 421 this is accomplished by directing the scarfing burner exclusively towards the bottom of the workpiece carrying the slag bead and, to be sure, at a certain angular setting to the workpiece. In the process according to DE-OS No. 28 31 152, the slag bead is melted and removed by means of a burner arrangement consisting of several burners whereby the burners which partly enclose the edge carrying the slag bead are directed towards the bottom and the cut surface. In both cases, therefore, the slag bead is melted in the area of the workpiece, where it is clearly visible, by one or more scarfing burners.

It was demonstrated that such an arrangement of scarfing burners is very expensive commercially. Either the workpiece must be turned or a cumbersome overhead scarfing must take place. The required number of scarfing burners is also increased since scarfing not only exclusively takes place in the cut surface area.

SUMMARY OF INVENTION

The invention is based on the object of arranging scarfing burners for the removal of slag beads in such a way that a special angular setting of the scarfing burners becomes unnecessary. The scarfing burners in their spatial arrangement can be easily operated, the number of scarfing burners to be used can be kept to a minimum and a perfect removal of the slag bead from the workpiece nevertheless takes place.

This object is met according to the invention by directing the scarfing burner only towards the cut surface of the flame-cut workpiece.

According to a further refinement of the invention, the scarfing burner is directed towards the area of the cut surface adjacent to the slag bead adhering to the bottom of the workpiece. This area preferably extends at least 20 mm into the cut surface from the edge between the bottom and the cut surface in the direction of the burner. At first, it might seem paradoxical to scarf away the slag bead at this location where it is optically not at all present.

THE DRAWINGS

FIG. 1 shows the arrangement of the scarfing burner according to the invention for removal of the slag bead; and FIG. 2 shows an enlarged view of a workpiece edge with slag bead.

DETAILED DESCRIPTION

FIG. 1 shows a part of workpiece 10, for example, a slab which has been cut into sections by means of an oxyacetylene burner 12 shown in dotted outline. The cut surface produced by the oxy-acetylene burner 12 is designated with the reference number 14.

The cutting slag produced in flame cutting flows downward during cutting along the cut surface 14 (cutting seam) in FIG. 1.

This downward movement does not only take place on the basis of gravity but the cutting slag is first driven from the cutting seam by the kinetic energy of the cutting oxygen jet 12a. The ideal situation per se would be that the cutting slag would be blown completely from the cutting seam and especially from the workpiece area with appropriately high kinetic energy by the cutting oxygen jet 12a. This is, however, not the case in daily practice. After leaving the cutting seam defined by the cut surfaces 14, the cutting slag flows rather by adhesion-determination around the bottom edge 16 of the workpiece 10 in the direction of the workpiece bottom 18. In this way, a so-called slag bead 20 is formed along the cutting seam at the bottom 18.

This slag bead 20 consists of a "mixture" of iron oxide and iron whereby the pure ion percentage as a rule is lower than the iron oxide percentage. The slag bead 20 with its predominant amount of material is arranged relatively "loose" on the bottom 18 of the workpiece 10, in other words, between the slag bead 20 and the bottom 18 only a slight adhesive connection exists. The reason is that, on one hand, the liquid cutting slag already cools off on its way to the bottom and, on the other hand, the oxide portion is already so high that any melting of the bottom and, therefore, an intimate connection between the cutting slag and the base material of the workpiece cannot take place.

In contrast, a thin metal film 24 with a high iron content is produced, however, at the bottom area 22 of the cut surface suring the flame cutting procedure, which is firmly connected with the base material of the cut surface 14 and becomes the slag bead 20.

As a result of this metal film 24, the solid connection of the slag bead with the workpiece takes place, to be sure, in the area 22 of the cut surface 14 and not, as optically suggested at first sight, at the bottom of the workpiece.

In order to eliminate the slag bead 20 from the bottom 18 of the workpiece 10, the metal film 24 holding the slag bead 20 is, therefore, removed according to the invention, which is present at the adjacent vertical cut surface 14 and, to be sure, primarily in its lower area 22 facing the edge 16 formed there by the flame-cutting procedure.

According to the invention, a scarfing burner 26 is exclusively associated for this purpose with the cut surface 14. After complete flame cutting by means of the oxy-acetylene burner 12 the cut surface 14 is scarfed and to be sure preferably only in the area 22 in which the metal film 24 is solidly connected with the base material of the workpiece 10. This area 22 extends from the edge 16 at least 20 mm into the cut surface 14 in the direction of the burner 12. The maximum height of the area 22 is determined by the slab height and can cover the entire slab height with slabs with a very low height. By scarfing the area 22 not only the metal film but—and this is significant according to the invention—the slag bead 20 adhering to this film is, therefore, also removed in an advantageous manner. The slag bead drops from the bottom 18 as a result of its almost absent adhesion. The scarfing burner 26 necessary for scarfing the area 22 needs to be dimensioned per se in such a way that the emerging scarfing oxygen jet 26a only scarfs this area for the complete removal of the metal film 24.

What is claimed is:

1. In an arrangement of a scarfing burner for removing the slag bed produced during flame cutting of a workpiece, the improvement being in that the scarfing burner is directed only towards the cut surface of the flame-cut workpiece.

2. Arrangement according to claim 1, characterized in that the scarfing burner is directed towards the area of the cut surface adjacent to the slag bead which adheres to the bottom of the workpiece.

3. Arrangement according to claim 2, characterized in that said area extends from the edge at least 20 mm into the cut surface in the direction of the burner.

4. In a method for removing the slag bead produced during a flame cutting of a workpiece, the improvement being directing a scarfing burner only towards the cut surface of the flame-cut workpiece.

5. The method of claim 4 wherein the scarfing burner is directed towards the area of the cut surface adjacent the slag bead which adheres to the bottom of the workpiece.

6. In the method of claim 5 wherein the area of the cut surface extends from the edge at least 20 mm into the cut surface in the direction of the burner.

* * * * *